(12) United States Patent
Mariani et al.

(10) Patent No.: US 8,844,589 B2
(45) Date of Patent: Sep. 30, 2014

(54) MOTORCYCLE TYRE

(75) Inventors: Mario Mariani, Milan (IT); Luca Bruschelli, Milan (IT); Andrea Schiavolin, Milan (IT); Sandro Gallo, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 780 days.

(21) Appl. No.: 13/122,552

(22) PCT Filed: Oct. 8, 2008

(86) PCT No.: PCT/IT2008/000638
§ 371 (c)(1),
(2), (4) Date: Jun. 24, 2011

(87) PCT Pub. No.: WO2010/041283
PCT Pub. Date: Apr. 15, 2010

(65) Prior Publication Data
US 2011/0247738 A1    Oct. 13, 2011

(51) Int. Cl.
*B60C 11/117* (2006.01)
*B60C 11/00* (2006.01)
*B60C 19/00* (2006.01)
*B60C 11/03* (2006.01)

(52) U.S. Cl.
CPC .......... *B60C 19/001* (2013.01); *B60C 11/0083* (2013.04); *B60C 2200/10* (2013.04); *B60C 11/033* (2013.04); *B60C 11/0311* (2013.04); Y10S 152/904 (2013.01)
USPC .............. 152/209.11; 152/209.8; 152/209.18; 152/209.28; 152/904

(58) Field of Classification Search
CPC   B60C 11/03; B60C 11/0302; B60C 11/0304; B60C 11/032; B60C 2200/12; B60C 2200/14; B60C 2011/0358; B60C 2011/0372; B60C 2011/0374; B60C 2011/0381; B60C 2011/0383; B60C 11/13
USPC ............... 152/209.28, 209.11, 209.18, 209.8, 152/903, 904, 209.1, 209.16, 209.17; D12/110, 900, 533–535, 563–567
See application file for complete search history.

(56) References Cited

U.S. PATENT DOCUMENTS 6,220,320 B1   4/2001 Nakagawa et al.
D518,434 S *   4/2006 Steinbach .................... D12/535
(Continued)

FOREIGN PATENT DOCUMENTS

EP   0 861 740 A2   9/1998
EP   1 884 337 A1   2/2008

OTHER PUBLICATIONS

International Search Report from the European Patent Office for International Application No. PCT/IT2008/000638 (Mail date Jun. 12, 2009).

*Primary Examiner* — Eric Hug
(74) *Attorney, Agent, or Firm* — Finnegan, Henderson, Farabow, Garrett & Dunner, L.L.P.

(57) ABSTRACT

Motorcycle tire suitable for mounting on the rear wheel of a motorcycle, including a tread band having a tread pattern includes a module which is repeated in a direction of circumferential extension of the tire, the module having: at least two substantially longitudinal first grooves which are inclined opposite to each other with respect to the equatorial plane of the tire; and at least two substantially longitudinal second grooves which are inclined opposite to each other with respect to the equatorial plane. Each substantially longitudinal first groove alternates with a second longitudinal groove. The substantially longitudinal first grooves have, in a direction axially away from the equatorial plane of the tire, two substantially consecutive curvilinear sections, the first section of which has a convexity and the second section of which has a concavity directed in the rolling direction of the tire. The first curvilinear section defines along its extension with the equatorial plane angles smaller than or equal to 90°.

31 Claims, 4 Drawing Sheets

(56) References Cited

U.S. PATENT DOCUMENTS

| | | | |
|---|---|---|---|
| 7,234,497 B2 * | 6/2007 | Yamane | 152/209.11 |
| D555,073 S * | 11/2007 | Zawistowski et al. | D12/535 |
| D555,074 S * | 11/2007 | Zawistowski et al. | D12/535 |
| D558,130 S * | 12/2007 | Steinbach | D12/535 |
| D606,004 S * | 12/2009 | Donnelly et al. | D12/535 |
| D606,483 S * | 12/2009 | Donnelly et al. | D12/535 |
| D619,956 S * | 7/2010 | Hayashi et al. | D12/535 |
| D625,683 S * | 10/2010 | Otani | D12/535 |
| D625,684 S * | 10/2010 | Otani | D12/535 |
| 2002/0000278 A1 * | 1/2002 | Cesarini et al. | 152/209.25 |
| 2003/0116247 A1 * | 6/2003 | Armellin et al. | 152/209.11 |
| 2006/0219342 A1 * | 10/2006 | Steinbach | 152/209.11 |
| 2009/0078349 A1 | 3/2009 | Nakagawa | |
| 2010/0126645 A1 * | 5/2010 | Barboza et al. | 152/209.11 |
| 2010/0193095 A1 * | 8/2010 | Nakagawa | 152/209.5 |

* cited by examiner

MOTORCYCLE TYRE

CROSS REFERENCE TO RELATED APPLICATION

This application is a national phase application based on PCT/IT2008/000638, filed Oct. 8, 2008, the content of which is incorporated herein by reference.

FIELD OF THE INVENTION

The present invention relates to motorcycle tyres. In particular, the present invention relates to tyres intended to be mounted on the rear wheels of "supersport" motorcycles with a large engine capacity (for example 1000 cm$^3$ or more) and/or high power (for example 100-180 HP or more) which are also used on racing tracks.

PRIOR ART

Figure 1A:
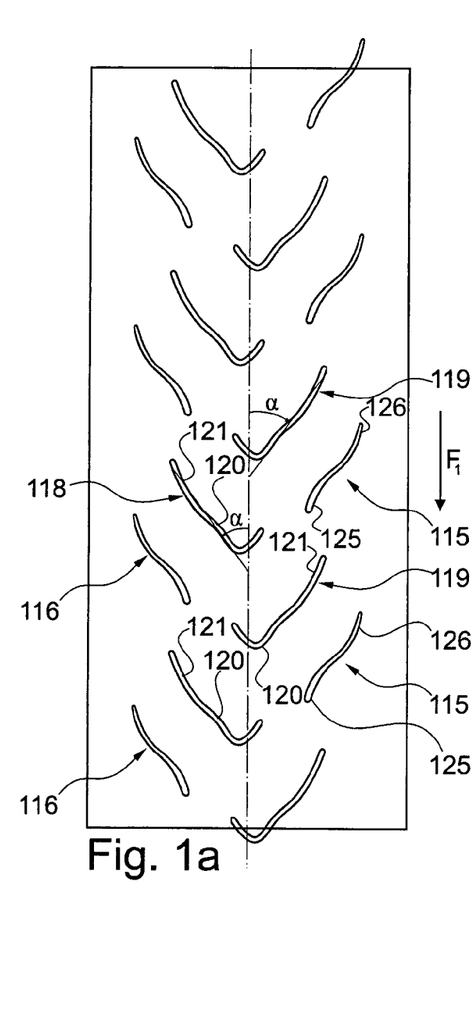
FIGS. 1a and 1b show, respectively, a portion of the circumferential extension of the tread of a rear tyre and a front tyre which are known according to the state of the art, as described above.
Figure 1B:
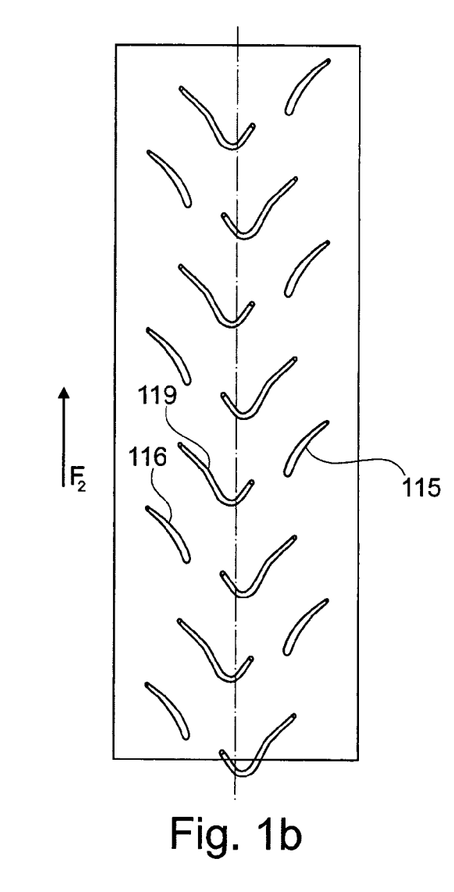

FIGS. 1a and 1b show a laterally extended view of a tread portion of a known tyre of the Applicant, marketed under the trade name Racetec™, which is suitable for mainly sporting use on motorcycles with a large engine capacity. In particular, FIG. 1a shows the tread pattern of a Racetec™ tyre which is suitable for mounting on a rear wheel of a motorcycle, while FIG. 1b shows the tread pattern of a Racetec™ tyre which is suitable for mounting on a front wheel of a motorcycle.

With reference to FIGS. 1a and 1b, the tread has a tread pattern comprising a plurality of grooves defining overall on said tread band a solid/void ratio of between 4% and 10%.

In particular, the tread pattern comprises a plurality of substantially longitudinal first grooves 118; 119 which are inclined opposite to each other with respect to the equatorial plane X-X of the tyre and a plurality of substantially longitudinal second grooves 115; 116 which are inclined opposite to each other with respect to the equatorial plane X-X of the tyre. Each first longitudinal groove 118;119 alternates with a second longitudinal groove 115;116.

In the tyre intended to be mounted on the rear wheel each first and second groove has two curvilinear sections 120;121; 125;126 which are circumferentially consecutive (in a direction axially away from the equatorial plane X-X), the first section 120;125 having a concavity and the second section 121;126 having a convexity directed in the rolling direction of the tyre indicated by the arrow F1 in FIG. 1a.

In the tyre intended to be mounted on the rear wheel (FIG. 1b), on the other hand, each first longitudinal groove has at least one curvilinear section with respect to the rolling direction of the tyre extending axially away from the equatorial plane X-X towards the shoulder.

The pattern shown in FIGS. 1a and 1b is formed on the tread of a tyre which has a radial carcass with, arranged on top, a belt structure comprising at least one layer of cords arranged substantially in a circumferential direction.

The tyre Racetec™ is very popular with motorcyclists because of its optimum characteristics in terms of steering, grip, handling and stability also at high speeds. In particular, its tread pattern helps ensure a suitable contact area in the various riding conditions (along straights and/or around bends) and ensures adequate drainage of the water off-track on wet asphalt.

SUMMARY OF THE INVENTION

Recently there has been a tendency to introduce onto the market increasingly more powerful motorcycles for supersport use. In fact there already exist on the market, for example, motorcycles for road use with an engine capacity of 1000 m$^3$ and power of 180 HP.

In order to cater for such powerful performance characteristics, the tyres mounted on the wheels of these motorcycles must have excellent properties in terms of road grip so as to be able to transmit effectively to the ground the high driving torque both during travel along straights and when accelerating out of bends and also ensure an effective braking action. Grip becomes a highly critical factor during travel on a wet road surface.

In order to guarantee the motorcyclist such performance characteristics in an entirely safe manner, together with an optimum road grip, the tyres must ensure behavioural stability both during travel along straights and (or in particular) during travel around bends and in particular during high acceleration. The stable behaviour of the tyre is in fact an indication as to its ability to dampen effectively the vibrations transmitted by the roughness of the road surfaces during travel so that these vibrations are not transmitted to the motorcycle, adversely affecting the riding stability.

The use in the tread band of compounds which are softer, namely better able to adapt to the profile resulting from the roughness of the road surface and/or penetrate into this roughness, characterized by a lower modulus of elasticity and/or high hysteresis, in theory should satisfy the requirements for grip of tyres designed to be mounted on such powerful motorcycles. During tests carried out with the Racetec™ tyres described above, however, the Applicant has noted that the use of these compounds in these tyres could cause irregular wear in the shoulder region, resulting in initial signs of wear at the axially outer ends of the grooves and a consequent reduction in the behavioural stability.

The Applicant has therefore considered the problem of providing tyres for motorcycles able to ensure, also in the case where soft compounds are used, adequate characteristics in terms of behavioural stability and uniform wear substantially in any travel conditions of the motorcycle, in particular in critical conditions such as high acceleration/deceleration into/out of a bend and/or travel around bends at high speed.

The Applicant has found that this problem may be solved by using a tread pattern with grooves having a particular curvilinear progression. The Applicant considers that the more spaced arrangement of the grooves counteracts the mobility of the tread band compound, ensuring a stabilizing effect vis-á-vis the vibrations arising during travel on a road surface and wear resistance of the tread band. Moreover, the Applicant has found that the particular curvilinear progression of the substantially longitudinal grooves which have a greater extension reduces the formation of irregular wear at the axially outer ends thereof.

According to a first aspect, the invention relates to a motorcycle tyre suitable for mounting on the rear wheel of a motorcycle, comprising a tread band having a tread pattern comprising a module which is repeated in a direction of circumferential extension of the tyre, comprising:

at least two substantially longitudinal first grooves which are inclined opposite to each other with respect to the equatorial plane X-X of the tyre;

at least two substantially longitudinal second grooves which are inclined opposite to each other with respect to said equatorial plane X-X;

each substantially longitudinal first groove alternating with a second longitudinal groove;

the substantially longitudinal first grooves comprising, in a direction axially away from the equatorial plane X-X of the tyre, two substantially consecutive curvilinear sections, the first section of which has a convexity and the second section of which has a concavity directed in the rolling direction of the tyre;

the first curvilinear section defines along its extension with the equatorial plane X-X angles smaller than or equal to 90°.

For the purposes of the present invention, the expression "tread pattern module" is understood as meaning a tread pattern portion which is repeated in an identical manner in succession along the whole circumferential extension of the tread band itself. The modules, while having the same configuration in terms of pattern, may however have different circumferential lengths.

Moreover, for the purposes of the present invention, the expression "tread pattern" is understood as meaning the representation of all those points of the tread band (including grooves) which are situated in a plane perpendicular to the equatorial plane of the tyre and tangential to the maximum diameter of the tyre. In said representation:

in the lateral direction the distance of each point of the tread band from the equatorial plane corresponds to the distance of this point from the equatorial plane measured along the lateral extension of the band itself;

in the circumferential direction the distance between any two points of the tread band corresponds to the distance between the projections of the two points on the circumference corresponding to the maximum diameter of the tyre, said projection being achieved by means of radial planes passing through the two points.

The expression "substantially consecutive curvilinear sections", for the purposes of the present invention, refers to two curvilinear sections situated directly after one another, but also to curvilinear sections which are connected by a substantially rectilinear portion having an extension smaller than or equal to the minimum extension of the curvilinear sections.

The measurements of angles and/or linear quantities (distances, widths, lengths, etc.) and/or surfaces are to be regarded as referring to the tread pattern as defined above.

Moreover, with reference to the inclination of the grooves formed in the tread band relative to the equatorial plane of the tyre, this inclination is to be understood for each point of the groove as referring to the angle (ranging between 0° and 180°) resulting from a rotation performed from the equatorial plane into the direction tangential to the groove passing through this point. In the case of a tyre suitable for mounting on a front wheel of a motorcycle, the rotation is to be understood as performed by a vector initially lying in the direction defined, in the tread pattern, by the equatorial plane and oriented in the same direction as the predetermined direction of rotation of the tyre (see FIG. 1b). In the case of the tyre suitable for mounting on a rear wheel of a motorcycle, the rotation is to be understood as performed by a vector initially lying in the direction defined, in the tread pattern, by the equatorial plane and oriented in the opposite direction to the predetermined direction of rotation of the tyre (see FIG. 3).

Moreover, for the purposes of the present invention, the following definitions apply:

"motorcycle tyre" is understood as meaning a tyre having a high curvature ratio (typically greater than 0.200) able to achieve high camber angles during travel of the motorcycle around bends;

"camber angle" is understood as meaning the angle between the equatorial plane of the tyre mounted on the motorcycle wheel and a plane perpendicular to the road surface;

"equatorial plane" of the tyre is understood as meaning a plane which is perpendicular to the axis of rotation of the tyre and which divides the tyre into two symmetrically identical parts;

"circumferential direction" is understood as meaning a direction generally directed in the direction of rotation of the tyre or, in any case, slightly inclined with respect to the direction of rotation of the tyre;

"solid/void ratio" is understood as meaning the ratio of the overall surface area of the cavities in a given portion of the tyre tread pattern (or the entire tread pattern) to the overall surface area of the given tread pattern portion (or the entire tread pattern);

"lateral extension" of the tread band is understood as meaning the length of the arc which defines the radially outermost profile of the tread band in a cross-section of the tyre;

"radius of curvature" of the tyre is understood as meaning the ratio of the distance between the radially highest point of the tread band and the maximum chord of the tyre, to the same maximum chord of the tyre, in a cross-section thereof;

"average width" of a groove is understood as meaning the ratio of its surface area to its length;

"central zone" of the tyre is understood as meaning an axially extending zone equal to 60% of the tread band symmetrically situated on either side of the equatorial plane X-X.

According to one or more preferred aspects, the present invention may comprise one or more of the following characteristic features.

The module may be repeated along a circumferential direction of the tyre at the most 13 times, preferably at the most 10 times.

According to the Applicant such a low repetition of the first module helps ensure a more spaced arrangement of the grooves in the circumferential direction and counteracts the mobility of the compound used for the tread band, providing a stabilizing effect in response to the vibrations arising during travel on a road surface.

The first longitudinal grooves may define an angle smaller than or equal to 45° with the equatorial plane in at least one portion of the central zone of said tread band. Conveniently, by choosing a smaller angle for the central zone of the tread band, it is possible to reduce the frequency of the impact of the edges of the cavities with the ground during the rolling travel of the tyre at high speed along straights or around bends with a high radius of curvature, resulting in improvement in terms of behavioural stability of the tyre and better wear resistance.

Conveniently, the first curvilinear section of the first longitudinal grooves has a length, measured along its extension, greater than 60 mm.

Advantageously, the second curvilinear section of the first longitudinal grooves has a length measured, along its extension, greater than 40 mm.

The Applicant has noted that such an arrangement and extension of the first longitudinal grooves helps prevent initial irregular wear at the axially outer ends of said grooves. The Applicant considers that such an improvement is due to improved interaction of the tread pattern with the forces present and local deformation of the compound generally arising from use on high-performance vehicles.

Conveniently, the substantially longitudinal first grooves may have a third curvilinear section arranged in succession with the first curvilinear section and circumferentially opposite to the second curvilinear section.

The two substantially longitudinal first grooves may be staggered with respect to each other in the circumferential direction.

Advantageously, the second longitudinal grooves comprise two substantially consecutive curvilinear sections in a direction axially away from the equatorial plane X-X, the first section of which has a convexity and the second section of which has a concavity directed in the rolling direction of the tyre.

The second longitudinal grooves may be staggered in the circumferential direction.

These circumferential grooves may form an angle smaller than 45° with said equatorial plane along their entire extension (conveniently this angle may be kept equal to or less than 30°).

Conveniently, the transverse profile of said tread band may have a curvature ratio greater than or equal to 0.300. With these curvature values, the Applicant has noted a substantial improvement in the behaviour around bends, in particular of a tyre to be mounted on the rear wheel of the motorcycle, and more particularly when travelling around bends at high speed at the maximum camber angle permitted by the tyre/motorcycle unit, and/or during full acceleration out of a bend. The Applicant considers that this improvement depends on an increase in the area of contact zone between tyre and ground.

The solid/void ratio may be advantageously designed so as to be greater in the central zone than in the shoulder zones of the tread band. The Applicant has noted that with this choice, it is possible to obtain very effective drainage of the water during travel on a wet surface. During travel on a wet surface, in fact, in order to ensure an adequate riding safety margin, the maximum camber conditions cannot be achieved, such that it is possible to provide a greater number of cavities in the central zone than in the shoulder zone of the tread, while keeping a low overall solid/void ratio. As a result it is possible to ensure always optimum road-holding (prevention of aquaplaning) on a wet surface even during travel at high speed.

In order to avoid reducing excessively the number of grooves in the tread pattern, with a consequent reduction in safety in the event of travel on a wet surface, the tread pattern conveniently defines a solid/void ratio greater than 4% on the tread band.

The tread pattern in a tyre intended for sporting use and/or the "supersport" sector such as that according to the present invention may conveniently define a solid/void ratio at the most equal to 8% so as to avoid excessive mobility of the tread band compound.

On the rear tyre, at least one axially outer portion of said shoulder zones may have a solid/void ratio equal to zero. The Applicant has noted that, with this choice, it is possible to improve significantly the contact surface area around bends on a dry surface travelled at the maximum camber angle (or in any case at very high camber angles), with consequent greater grip, stability and capacity for acceleration out of the bend by the motorcycle. Moreover, the Applicant has noted that this solution does not constitute a danger during travel on a wet surface since the travel conditions are such that high camber angles cannot be achieved around a bend.

The tread pattern may define a solid/void ratio on the tread band which has a maximum value in a zone situated substantially along the equatorial plane X-X.

Conveniently, the tread pattern may define on the tread band a solid/void ratio decreasing from the equatorial plane X-X towards the shoulders of the tyre. Preferably the tread pattern may define on the tread band a solid/void ratio decreasing uniformly from the equatorial plane X-X towards the shoulders of the tyre. The Applicant has noted that such a solution is particularly advantageous for a tyre to be mounted on the rear wheel of a motorcycle, so as to obtain a gradual increase in rigidity in the response of the tyre when passing from travel along a straight to travel around a bend.

The motorcycle rider, leaning over when entering the bend after travel along a straight at high speed, will be unable to perceive a variable rigidity of the tyre with the consequent effects on the stability of the motorcycle, but a gradual increase in the rigidity as the leaning action is increased, owing to the gradual reduction of the solid/void ratio.

Preferably, in the rear tyre the first longitudinal grooves have an average width less than or equal to 6 mm.

Moreover, the first longitudinal grooves may have a depth less than or equal to about 6 mm.

The Applicant has noted that, with the abovementioned choices in terms of depth and width of the longitudinal grooves, it is possible to improve further the behavioural stability of the tread band even when particularly soft compounds are used.

According to a further aspect, the present invention refers to a pair of motorcycle tyres comprising a rear tyre as described above and a front tyre having a tread pattern comprising:

a plurality of grooves defining overall a solid/void ratio greater than 4% on the tread band;

a module repeated in the direction of circumferential extension of the tyre, the module comprising:

at least two substantially longitudinal first grooves which are inclined opposite each other with respect to the equatorial plane X-X;

at least two substantially longitudinal second grooves which are inclined opposite to each other with respect to the equatorial plane X-X;

in which each first longitudinal groove alternates with a second longitudinal groove; and in which the first longitudinal grooves have, in a direction axially away from the equatorial plane X-X, at least one curvilinear section with a concavity directed in the rolling direction of the tyre.

BRIEF DESCRIPTION OF THE DRAWINGS

Further characteristic features and advantages of the present invention will become clear from the following detailed description of a number of embodiments thereof provided by way of a non-limiting example, said description being provided with reference to the accompanying drawings in which:

FIG. 4 shows the progression of the solid/void ratio in a tyre comprising a tread band having a design according to the example of FIG. 3 compared to the progression of the solid/void ratio in a tyre comprising a tread band having a pattern according to the example of FIG. 1a.

DETAILED DESCRIPTION OF EMBODIMENTS OF THE INVENTION

With reference to the figures mentioned, 100 denotes overall a motorcycle tyre according to the present invention.

Figure 2:
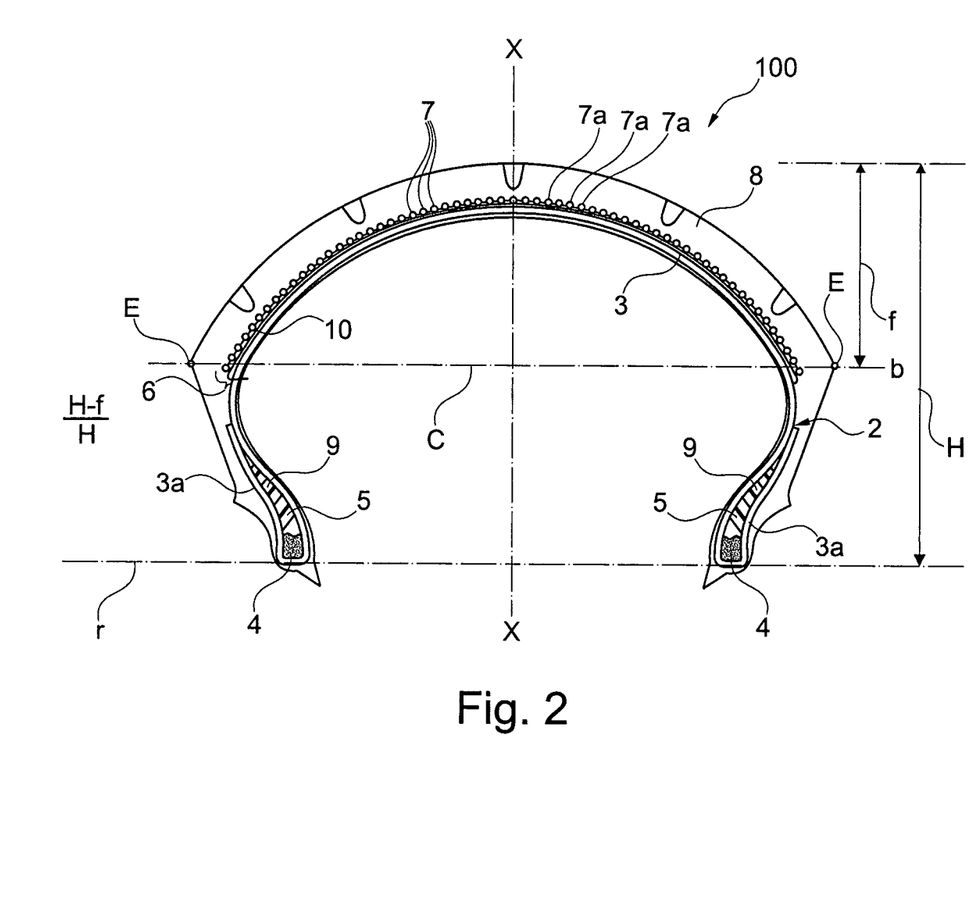
FIG. 2 shows schematically a half cross-section perpendicular to the equatorial plane of a motorcycle tyre.

The motorcycle tyre 100 comprises a carcass structure 2 formed by at least one carcass ply 3. The carcass ply 3 is made of elastomer material and comprises a plurality of reinforcing elements which are arranged parallel to each other.

The carcass ply 3 is engaged, by means of its opposite circumferential edges, with at least one annular reinforcing structure 9.

In particular, the opposite side edges 3a of the carcass ply 3 are folded back around the annular reinforcing structures which are called "bead wires".

The axially outer perimetral edge of the bead wires 4 have, mounted thereon, a tapered elastomer filling element 5 which occupies the space defined between the carcass ply 3 and the corresponding folded-back side edge 3a of the carcass ply 3.

As is known, the tyre zone comprising the bead wire 4 and the filling element 5 forms the so-called bead intended to fix the tyre onto a corresponding mounting rim (not shown).

The reinforcing elements included in the carcass ply 3 comprise preferably textile cords which are chosen from among those usually used in the manufacture of tyre carcasses, for example made of nylon, rayon, PET, PEN, with the basic strand having a diameter of between 0.35 mm and 1.5 mm.

In an alternative embodiment (not shown) the opposite side edges of the carcass ply are associated, without being folding back, with particular annular reinforcing structures 9 provided with two annular inserts. An elastomer filling element may be arranged in a position situated axially on the outside of the first annular insert. The second annular insert is, instead, arranged in a position situated axially on the outside of the carcass ply. Finally a further filling element which completes the design of the annular reinforcing structure may be provided in a position situated axially on the outside of said second annular insert, and not necessarily in contact therewith.

A belt structure 6 is circumferentially applied onto the carcass structure 2, in a radially outer position, said belt structure having, circumferentially arranged on top of it, a tread band 8 in which, following a moulding operation performed at the same time as vulcanization of the tyre, longitudinal and/or transverse grooves arranged so as to define a desired tread pattern are typically formed.

The tyre 100 may also comprise a pair of sidewalls which are applied laterally on opposite sides of said carcass structure 2.

The tyre 100 has a cross-section distinguished by a high transverse curvature and by lowered sidewalls as defined below.

In particular, the tyre 100 has a cross-sectional height H measured, along the equatorial plane, between the top of the tread band and the mounting diameter, defined by the reference line r passing through the tyre beads.

The tyre 100 also has a width C defined by the distance between the laterally opposite ends E of the tread itself and a curvature defined by the particular value of the ratio of the distance f between the top of the tread and the line passing through the ends E of the said tread, measured along the equatorial plane of the tyre, to the aforementioned width C. The ends E of the tread may be formed as a corner.

"Tyres with a high curvature" in the present description and in the following claims are understood as meaning tyres which have a curvature ratio f/C≥0.30. This curvature ratio f/C is, in any case, ≤0.8 and preferably f/C≤0.5.

As regards the sidewalls, the invention is preferably applicable to tyres with particularly low sidewalls (FIG. 1) in other words, "tyres with low or lowered sidewalls" in the present description is understood as meaning tyres in which the height/sidewall ratio (H−f)/H is less than 0.7 and more preferably less than 0.5, for example 0.38.

The carcass structure 2 is typically lined on its inner walls with a sealing layer, or so-called liner, essentially consisting of a layer of air-tight elastomer material designed to ensure hermetic sealing of the tyre once it has been inflated.

Preferably, the belt structure 6 consists of a layer 7 which has a plurality of circumferential windings 7a arranged axially alongside each other and formed by a rubberized cord or by a thin band comprising a number of rubberized cords (preferably two to five cords) which are spirally wound at an angle substantially equal to 0 (typically between 0° and 5°) with respect to the equatorial plane X-X of the tyre. Preferably the belt substantially extends substantially over the entire crown portion of the tyre.

Alternatively, the belt structure 6 may consist of at least two radially superimposed layers, each of which consists of elastomer material reinforced with cords arranged parallel to each other. The layers are arranged so that the cords in the first belt layer are directed obliquely with respect to the equatorial plane of the tyre, while the cords in the second layer are also directed obliquely, but symmetrically intersect the cords of the first layer (so-called "cross-ply belt").

The cords in the belt structure consisted of textile or metal cords. Preferably, said cords are formed using wires made of steel with a high carbon content (HT steel), i.e. wires made of steel with a carbon content greater than 0.9%. If textile cords are used, these may be made of synthetic fibre, for example nylon, rayon, PEN, PET, and preferably high-modulus synthetic fibre, in particular aramid fibre (for example Kevlar® fibres). Alternatively, hybrid cords may be used, i.e. cords comprising at least yarn with a low modulus, i.e. not greater than about 15,000 N/mm² (for example nylon or rayon), interwoven with at least 1 yarn with a high modulus (for example Kevlar®), i.e. not less than 25,000 N/mm².

Optionally, the tyre 100 may also comprise a layer of elastomer material 10 arranged between said carcass structure 2 and said belt structure 6 formed by said circumferential turns, said layer 10 extending preferably over an area substantially corresponding to the area of extension of said belt structure 6. Alternatively, said layer 10 extends over an area smaller than the area of extension of the belt structure 6, for example only over opposite lateral portions of the latter.

In a further embodiment, an additional layer of elastomer material (not shown in FIG. 1) is arranged between said belt structure 6 and said tread band 8, said layer extending preferably over an area substantially corresponding to the area of extension of said belt structure 6. Alternatively, said layer extends only over at least a portion of the extension of the belt structure 6, for example over opposite lateral portions of the latter.

In a preferred embodiment, at least either one of said layer 10 and said additional layer comprises short aramid fibres, for example made of Kevlar®, dispersed in said elastomer material.

Figure 3:
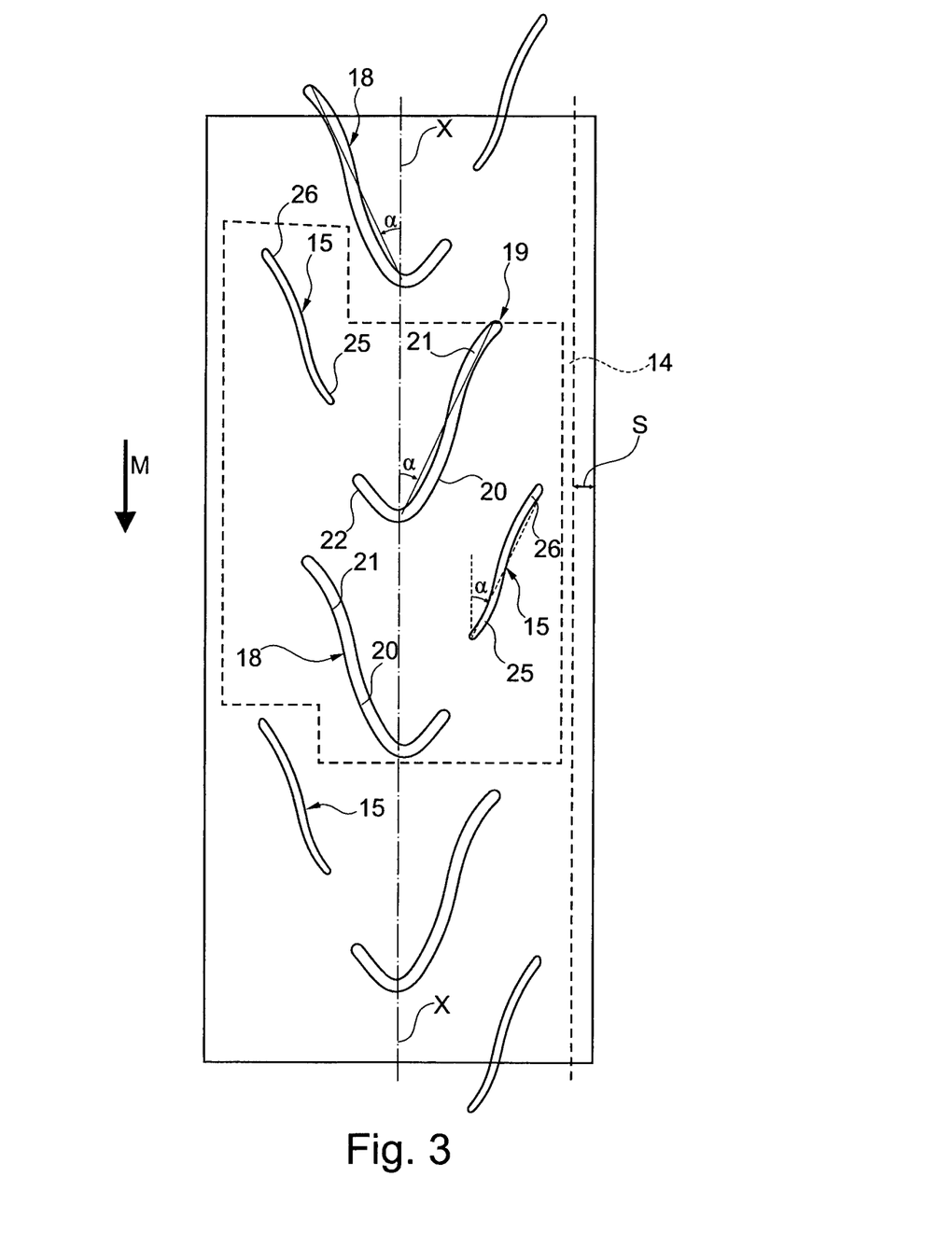
FIG. 3 shows a portion of the circumferential extension of a first example of a tread pattern to be applied to a tyre according to the invention, in particular for a tyre to be mounted on the rear wheel of a motorcycle.

The tread band 8, as shown in FIG. 3, has formed therein a tread pattern comprising a plurality of grooves defining overall on the tread band a solid/void ratio greater than 4%.

According to an advantageous aspect of the present invention, the tread pattern comprises a module 14 which is repeatedly reproduced along a direction of circumferential extension of the tyre. The module 14 is repeated at least 13 times along the circumferential extension of the tyre, and preferably at least 10 times, for example 7 times.

The module 14 has two substantially longitudinal first grooves 18, 19 which are inclined opposite each other with respect to the equatorial plane X-X, and two substantially longitudinal second grooves 15, 16 which are also inclined opposite to each other with respect to the equatorial plane X-X.

In a preferred embodiment, each first longitudinal groove 18, 19 alternates with a second longitudinal groove 15, 16.

The tread band 8 has, formed therein, first "long" grooves having a small inclination with respect to the equatorial plane X-X, less any portions of negligible length (for example smaller than or equal to ⅛th of the lateral extension of the tread band), alternating with second "shorter" grooves which also have a small inclination with respect to the equatorial plane X-X.

Preferably, the first main grooves 18, 19 define with the equatorial plane X-X an angle α less than or equal to 45°, for example equal to 30°, in at least one portion of the central zone of the tread band 8, namely in a zone situated astride the equatorial plane X-X and extending over a width equal to 60% of the lateral extension of the tread band 8.

In the preferred embodiment shown in FIG. 3, the first longitudinal grooves 18, 19 extend axially over a maximum width equal to 60% of the lateral extension of the tread band 8.

Preferably the first longitudinal grooves 18, 19 of each module 14 are staggered in the circumferential direction.

Also, the second longitudinal grooves 15, 16 of each module are preferably staggered relative to each other in the circumferential direction.

The example shown in FIG. 3 is a tyre which is to be mounted on the rear wheel of a motorcycle. In FIG. 3, the arrow indicated by "M" indicates the preferred direction of rotation or role in the tyre, while the straight dot-dash line X-X indicates the equatorial plane of the tyre. The tread band 8 is shown in the entire width of its lateral extension.

According to an important characteristic feature of the invention, each first longitudinal groove 18, 19 has two consecutive curvilinear sections 20, 21 in a direction axially away from the equatorial plane X-X. In detail, the first section 20 extends from the equatorial plane X-X and has a convexity in the rolling direction of the tyre, indicated by the arrow M in FIG. 3, while the second section 21 has a concavity in the rolling direction.

The first curvilinear section 20 defines along its extension angles less than or equal to 90° with the equatorial plane X-X According to a preferred embodiment, the first longitudinal grooves 18, 19 have a third curvilinear section 22 arranged in succession with the first curvilinear section 20, but on the opposite side with respect to the second curvilinear section 21.

In the embodiment shown in FIG. 3, the third section 22 extends from the equatorial plane X-X towards the shoulder which is axially opposite to the shoulder towards which the second curvilinear section 21 extends, so as to form with the first section 20 a convexity directed in the rolling direction of the tyre.

The third section is therefore arranged so as to form a "hook" with the first section 20.

The third section 22 has, along the equatorial plane, a portion substantially perpendicular to the equatorial plane X-X.

Advantageously, the first curvilinear section 20 of said first longitudinal grooves 18, 19 has a length measured along its extension greater than 60 mm, preferably greater than 75 mm, for example equal to about 82 mm.

Preferably, the first curvilinear section 20 has a length measured along its extension less than 130 mm.

Advantageously, the second curvilinear section 21 of said first longitudinal grooves 18, 19 has a length measured along its extension greater than 40 mm, for example equal to about 50 mm.

Preferably, the second curvilinear section 21 has a length measured along its extension less than 70 mm.

In the embodiment shown in FIG. 3 the longitudinal grooves 18, 19 have a depth decreasing so as to diminish from the equatorial plane X-X towards the shoulders, and preferably the grooves 18, 19 have a depth less than or equal to 6 mm.

According to an embodiment shown in FIG. 3, the first main grooves 18, 19 have a constant width along their extension, and preferably the grooves 18, 19 have a width less than or equal to 6 mm.

The Applicant has noted that, with the abovementioned choices in terms of depth and width of the first longitudinal grooves 18, 19, it is possible to improve further the behavioural stability of the tread band, also in the case where particularly soft compounds are used.

In the embodiment shown in FIG. 3 the substantially longitudinal second grooves define with the equatorial plane X-X an angle α less than or equal to 45°, for example equal to 30° in at least one portion of the central zone of the tread band 8, namely in a zone situated astride the equatorial plane X-X and extending over a width equal to 70% of the lateral extension of the tread band 8.

The second longitudinal grooves 15, 16 may extend axially over a maximum width equal to 70% of the lateral extension of the tread band 8.

The second grooves extend towards the shoulders of the tyre. In the embodiment shown in FIG. 3, preferably the second longitudinal grooves 15, 16 not extend from the equatorial plane X-X, but are situated at a distance from said plane The second longitudinal grooves 15, 16 have two curvilinear sections which are joined together and the first section 25 which has a convexity and the second section 26 of which has a concavity directed in the rolling direction of the tyre.

The second section 26 extends over a length, measured along its extension, which is 20% greater than that of the first section 25. In other words, the second section 26 has a length at least 1.2 times that of the first section 25.

The second longitudinal grooves 15, 16 have a depth decreasing so as to diminish towards the shoulders, and preferably the grooves 15, 16 have a depth less than or equal to 6 mm.

According to an embodiment shown in FIG. 3, the second longitudinal grooves 15, 16 have a width increasing along their extension so as to increase in the direction away from the equatorial plane X-X towards the shoulders, and preferably the grooves 15, 16 have a width less than or equal to 6 mm.

The tread pattern as in the example shown in FIG. 3 defines overall on the tread band 8 a solid/void ratio of less than 8% and preferably equal to about 7.0%. As may be noted, in axially outermost portions of the tread band having a width indicated by "s" (in the vicinity of the point "E" in FIG. 2) the pattern does not have grooves, namely defines a solid/void ratio equal to zero.

This choice may be particularly advantageous in the case of the rear tyre since it is possible not only to increase significantly the surface area of the contact zone between tyre and ground during travel around bends at the maximum camber angle, but also to form a closed tread band ring which increases the rigidity thereof in particular the rigidity in shear (namely in the plane of the lateral and longitudinal contact forces).

The increase in the area of the contact zone with the ground and the increase in the rigidity in shear may improve considerably the road-holding of the rear of the motor cycle when travelling around bends and/or the effective transmission to the ground of the tractional torque when accelerating out of a bend. The width "s", measured along the lateral extension of the tread band, of the axially outermost portions with a zero solid/void ratio may vary from zero up to a maximum of about 35 mm. Preferably, at least 5 mm of the width is left free of grooves in the tread band of a tyre suitable for mounting on the rear wheel of a motorcycle, in particular for the "supersport" sector.

According to an important aspect of the present invention, the tread pattern defines on the tread band a solid/void ratio decreasing from the equatorial plane towards the tyre shoulders. Preferably, the tread pattern defines on the tread band a solid/void ratio decreasing uniformly from the equatorial plane X-X towards the tyre shoulders.

This choice is particularly advantageous in the case of a tyre to be mounted on the rear wheel of a motorcycle, resulting in a gradual increase in rigidity in the response of the tyre when passing from travel along a straight to travel around a bend.

The motorcycle rider, when leaning into a bend after travel along a straight at high speed will not note a variable rigidity of the tyre and the consequent effects on the stability of the motorcycle, but will perceive a gradual increase in rigidity with an increase in the leaning action, due to the reduction in the solid/void ratio.

Figure 4:
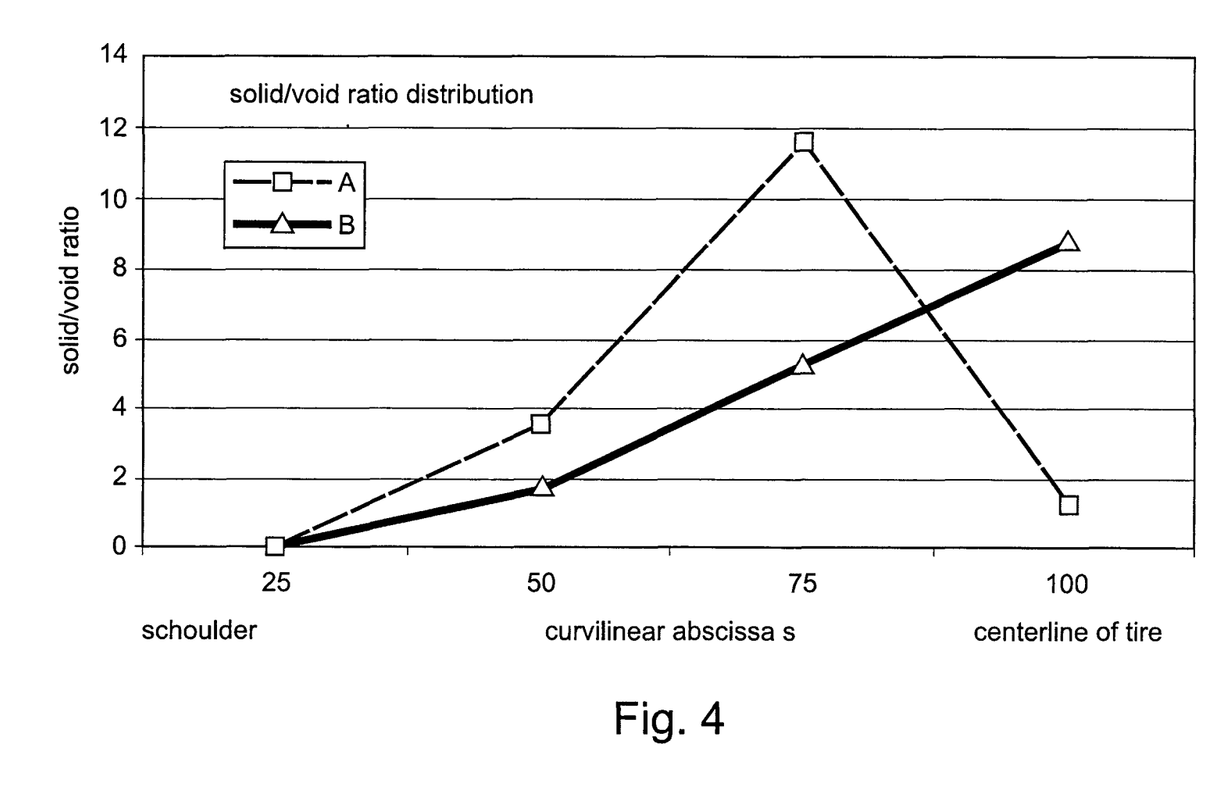

FIG. 4 shows the progression of the solid/void ratio, depending on the position on the curvilinear profile of the cross-section of the tyre, defined by the tread pattern according to FIG. 3. In particular, the solid/void ratio defined by the tread pattern according to FIG. 3 (invention) is shown along the y axis. The x axis shows points along the curvilinear profile of half the cross-section of the tyre, where the value 100 indicates the equatorial plane and 0 indicates the axially outer end E of the tread band.

The continuous line in FIG. 4 indicates the solid/void ratio defined by the tread pattern according to FIG. 3 as a whole compared to the solid/void ratio defined by the pattern according to FIG. 1a (shown as a broken line).

In particular, the solid/void ratio defined by the tread pattern according to FIG. 1a is greater than the solid/void ratio defined by the tread pattern according to FIG. 3 along a first section (from zero to 75 namely from the axially outer end E to three-quarters of the profile) and then diminishes gradually until it becomes smaller in a zone extending astride the equatorial plane X-X.

Overall, the tread pattern according to FIG. 3 therefore has a smaller number of grooves than the tread pattern according to FIG. 1a and in particular a different distribution.

The Applicant has in fact noted that, for this class of motorcycles, drainage is performed in particular by a portion of the tread band situated astride the equatorial plane and that an increasingly greater rigidity in the tyre is required as one moves away from the equatorial plane towards the shoulders.

The Applicant has also noted that this increase in rigidity, if it occurs in a uniformly continuous manner, does not result in the motorcycle rider noting any instability when passing from travel along a straight to travel around a bend and vice versa.

As may be noted, the decrease in the solid/void ratio in the tread pattern according to FIG. 3 compared to the tread pattern according to FIG. 1a is maintained over the entire lateral extension of the tread band, except for the zone astride the equatorial plane where the tread pattern according to FIG. 3 has a greater solid/void ratio in order to ensure the abovementioned proportional rigidity characteristic. In this case also, the central zone in the tread band has a greater solid/void ratio than the shoulders zones.

The following Table 1 shows the results obtained from an example of a tyre according to the invention with a size 190/50 ZR 17 for use on the rear wheel of a motorcycle (Yamaha YZF R1, Suzuki GSX 1000) comprising a tread band with a pattern such as that shown in the above FIG. 3. The results in Table 1 have been calculated taking into account a reference value of 100 for a comparison tyre, Racetec® model, with the same size and carcass/belt structure, comprising a tread band with a pattern such as that shown in FIG. 1a.

The tyre of the example according to the invention has a curvature ratio equal to 0.309 like that of the comparison tyre.

Moreover, the tread band of the tyre of the example according to the invention uses a compound which is softer than that used in the tread band of the comparison tyre, with a higher tan δ value and lower modulus of the elasticity at a high temperature (70°).

Table 1 shows the values for four parameters obtained with the tyre according to the invention compared to the reference tyre: grip on a track under limit conditions around a bend, control under limit conditions around a bend on a track, deterioration in performance and wear on a track, wear during roadway travel.

For each of the four parameters the impact of the following tyre characteristics were assessed: the carcass/belt structure, the curvature profile, the tread pattern and the compound. The column "Total" represents the product (expressed as a percentage) of the various values.

TABLE 1

|  | Structure | Profile | Pattern | Compound | Total |
|---|---|---|---|---|---|
| Grip on a track under limit conditions around a bend | 100 | 100 | 105 | 105 | 105 |
| Control on a track under limit conditions around a bend | 100 | 100 | 115 | 105 | 110 |
| Deterioration of performance and wear on a track | 100 | 100 | 110 | 100 | 110 |
| Wear during roadway travel | 100 | 100 | 105 | 105 | 105 |

The tyre according to the invention has an overall behaviour better than that of the comparison tyre in respect of all the characteristics assessed.

As can be noted, the tread pattern plays an extremely important part in the behaviour of the tyre on a racing track when riding under limit conditions around a bend both during maximum braking into the bend and during maximum acceleration out of the bend. In particular, the tread pattern is able to make up effectively for a reduction in the stability when accelerating out of the bend, due to the softer compound. On the other hand, the use of the softer compound is able to offset the per se less effective behaviour of the tread pattern of the tyre according to the invention on a wet surface, due to the smaller solid/void ratio, while benefitting the behaviour on a dry surface.

The tyre according to the invention works particularly well in combination with a front tyre having a tread pattern comprising:

a plurality of grooves defining overall on the tread band a solid/void ratio greater than 4%;

a module repeated in a direction of circumferential extension of the tyre, the module comprising:

at least two substantially longitudinal first grooves inclined opposite to each other with respect to the equatorial plane X-X;

at least two substantially longitudinal second grooves inclined opposite to each other with respect to the equatorial plane X-X;

each first longitudinal groove alternating with a second longitudinal groove.

The first longitudinal grooves have, in a direction axially away from the equatorial plane X-X, at least one curvilinear section which has a concavity directed in the rolling direction of the tyre.

Preferably, the first longitudinal grooves have a second curvilinear section arranged in succession with the first section in a direction axially away from the equatorial plane X-X. Said second section of each first longitudinal groove has a convexity directed in the rolling direction of the tyre.

In this case also, preferably, the main grooves define with the equatorial plane X-X an angle α smaller than or equal to 45°, for example equal to 30° in at least one portion of the central zone of the tread band, namely in a zone situated astride the equatorial plane X-X and extending over a width equal to 60% of the lateral extension of the tread band.

The first longitudinal grooves of each module of the front tyre are staggered with respect to each other in the circumferential direction.

The second longitudinal grooves of each module are also staggered with respect to each other in the circumferential direction.

The first longitudinal grooves of the front tyre may have a third curvilinear section arranged in succession with the first curvilinear section, but on the opposite side to the second curvilinear section.

In this case, the third section extends from the equatorial plane X-X towards the shoulder situated axially opposite to the shoulder towards which the second curvilinear section extends.

The first curvilinear section of the first longitudinal grooves of the front tyre has a length, measured along its extension, greater than the length of the second section.

Moreover, these first longitudinal grooves of the front tyre define with the equatorial plane X-X an angle smaller than or equal to 45° in at least one portion defined by the first and second curvilinear section.

Also, the second longitudinal grooves of the front tyre define with the equatorial plane an angle smaller than or equal to 45°.

Conveniently the solid/void ratio of the front tyre is greater in the central zone than in the shoulder zones of the tyre and at least one axially outer portion of the abovementioned shoulder zones of the front tyre has a solid/void ratio equal to zero.

In order to ensure a proportional rigidity effect in the response of the tyre when passing from travel along a straight to travel around a bend the tread pattern of such a front tyre defines on the tread band a solid/void ratio decreasing uniformly from the equatorial plane X-X towards the tyre shoulders.

With this solution both the front tyre and the rear tyre of the pair work in unison in terms of an increasing proportional rigidity in the response when changing from travel along a straight to travel around a bend.

In particular, the tread pattern of the front tyre defines on said tread band along the equatorial plane X-X a solid/void ratio greater than 6%.

The present invention has been described with reference to a number of embodiments. Various modifications may be made to the embodiments described in detail, while remaining, however, within the scope of the protection of the invention as defined by the following claims. For example, in the tread pattern it is possible to use grooves formed by a broken line composed of straight sections joined together, instead of curvilinear grooves.

The invention claimed is:

1. A motorcycle tyre suitable for mounting on a rear wheel of a motorcycle, comprising a tread band having a tread pattern comprising a module which is repeated in a direction of circumferential extension of the tyre, comprising:

at least two substantially longitudinal first grooves, which are inclined opposite each other with respect to an equatorial plane of the tyre, and which intersect said equatorial plane; and at least two substantially longitudinal second grooves which are inclined opposite each other with respect to said equatorial plane, each substantially longitudinal first groove alternating with a second longitudinal groove, wherein the substantially longitudinal first grooves comprise, in a direction axially away from the equatorial plane of the tyre, two substantially consecutive curvilinear sections, a first curvilinear section of which has a convexity and a second curvilinear section of which has a concavity directed in a rolling direction of the tyre, the first curvilinear section defining along an extension thereof with equatorial plane angles smaller than or equal to 90°.

2. The motorcycle tyre according to claim 1, wherein the grooves of the tread pattern define overall on said tread pattern a solid/void ratio greater than 4%.

3. The motorcycle tyre according to claim 1, wherein the first substantially longitudinal grooves have a third curvilinear section arranged in succession with the first curvilinear section and circumferentially opposite said second curvilinear section.

4. The motorcycle tyre according to claim 1, wherein said two substantially longitudinal first grooves are staggered with respect to each other in the circumferential direction.

5. The motorcycle tyre according to claim 1, wherein the substantially longitudinal second grooves comprise two consecutive curvilinear sections, the first curvilinear section of which has a convexity and the second curvilinear section of which has a concavity directed in the rolling direction of the tyre.

6. The motorcycle tyre according to claim 1, wherein said two second longitudinal grooves are staggered with respect to each other in the circumferential direction.

7. The motorcycle tyre according to claim 1, wherein said first longitudinal grooves define with said equatorial plane an angle smaller than or equal to 45° in at least one portion defined by said first and second curvilinear sections.

8. The motorcycle tyre according to claim 1, wherein said second longitudinal grooves define with said equatorial plane an angle smaller than or equal to 45° along an entire extension thereof.

9. The motorcycle tyre according to claim 1, wherein said first curvilinear section of said first longitudinal grooves has a length measured along its extension greater than 60 mm.

10. The motorcycle tyre according to claim 1, wherein said second curvilinear section of said first longitudinal grooves has a length measured along an extension thereof greater than 40 mm.

11. The motorcycle tyre according to claim 1, wherein a transverse profile of said tread band has a curvature ratio greater than or equal to 0.300.

12. The motorcycle tyre according to claim 1, wherein the grooves of the tread pattern define on said tread band a solid/void ratio greater in a central zone than in shoulder zones of the tread band.

13. The motorcycle tyre according to claim 1, wherein said tread pattern defines overall on said tread band a solid/void ratio less than 8%.

14. The motorcycle tyre according to claim 12, wherein at least one axially outer portion of said shoulder zones has a solid/void ratio equal to zero.

15. The motorcycle tyre according to claim 1, wherein said tread pattern defines on said tread band a solid/void ratio decreasing uniformly from the equatorial plane toward tyre shoulders.

16. The motorcycle tyre according to claim 12, wherein said tread pattern defines on said tread band, along the equatorial plane, a solid/void ratio greater than 6%.

17. The motorcycle tyre according to claim 1, wherein said first grooves have an average width less than or equal to about 6 mm.

18. The motorcycle tyre according to claim 1, wherein said first grooves have a depth less than or equal to about 6 mm.

19. A pair of tyres for a motorcycle, comprising a rear tyre as claimed in claim 1, and a front tyre with a tread pattern comprising:
   a plurality of grooves defining overall on a tread band a solid/void ratio greater than 4%;
   a module repeated in a direction of circumferential extension of the tyre, comprising:
   at least two substantially longitudinal first grooves inclined opposite each other with respect to an equatorial plane; and
   at least two substantially longitudinal second grooves inclined opposite each other with respect to the equatorial plane,
   wherein each first longitudinal groove alternates with a second longitudinal groove, and
   wherein the first longitudinal grooves have, in a direction axially away from the equatorial plane, at least one curvilinear section having a concavity directed in a rolling direction of the tyre.

20. The pair of motorcycle tyres according to claim 19, wherein the first longitudinal grooves of the front tyre have, in a direction axially away from the equatorial plane, at least one second curvilinear section in succession with the first curvilinear section and concave with respect to the rolling direction of the tyre.

21. The pair of motorcycle tyres according to claim 19, wherein the first substantially longitudinal grooves of the front tyre have a third curvilinear section arranged in succession with the first curvilinear section and circumferentially opposite the second curvilinear section.

22. The pair of motorcycle tyres according to claim 19, wherein said two substantially longitudinal first grooves of the front tyre are staggered with respect to each other in a circumferential direction.

23. The pair of motorcycle tyres according to claim 19, wherein the second grooves of the front tyre comprise in a direction axially away from said circumferential direction two substantially consecutive curvilinear sections.

24. The pair of motorcycle tyres according to claim 19, wherein said two second circumferential grooves of the front tyre are staggered with respect to each other in a circumferential direction.

25. The pair of motorcycle tyres according to claim 19, wherein said first longitudinal grooves of the front tyre define with said equatorial plane an angle smaller than or equal to 45° in at least one portion defined by first and second curvilinear sections.

26. The pair of motorcycle tyres according to claim 19, wherein said second longitudinal grooves of the front tyre define an angle with said equatorial plane smaller than or equal to 45°.

27. The pair of motorcycle tyres according to claim 20, wherein said first curvilinear section of said first longitudinal grooves of the front tyre have a length measured along an extension thereof greater than a length of the second curvilinear section.

28. The pair of motorcycle tyres according to claim 19, wherein a solid/void ratio of the front tyre is greater in a central zone than in shoulder zones of the tread band.

29. The pair of motorcycle tyres according to claim 28, wherein at least one axially outer portion of said shoulder zones of the front tyre has a solid/void ratio equal to zero.

30. The pair of motorcycle tyres according to claim 19, wherein said tread pattern defines on said tread band a solid/void ratio decreasing uniformly from the equatorial plane toward tyre shoulders.

31. The pair of motorcycle tyres according to claim 27, wherein said tread pattern of the front tyre defines on said tread band, along the equatorial plane, a solid/void ratio greater than 6%.

* * * * *